Feb. 23, 1932.     R. THOMSON     1,846,373
TAP
Filed June 20, 1930      2 Sheets-Sheet 1

INVENTOR
ROBERT THOMSON
BY
ATTORNEYS

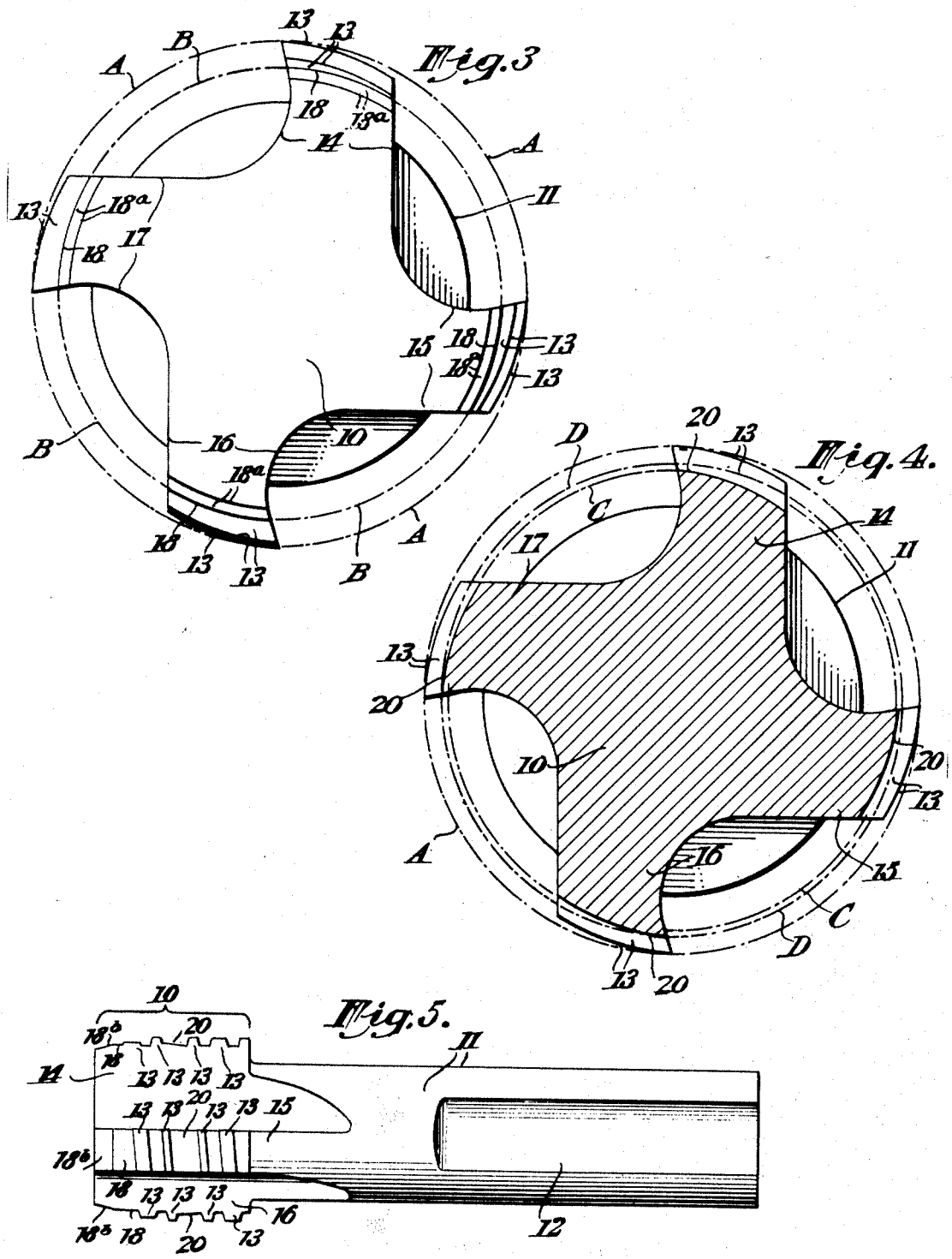

Patented Feb. 23, 1932

1,846,373

UNITED STATES PATENT OFFICE

ROBERT THOMSON, OF NEWARK, NEW JERSEY, ASSIGNOR TO DARDELET THREADLOCK CORPORATION, OF NEW YORK, N. Y., A CORPORATION OF DELAWARE

TAP

Application filed June 20, 1930. Serial No. 462,537.

This invention relates to improvements in taps for cutting internal screw threads.

One important object of the invention is to provide an efficient tap having a very short cutting portion whereby a large saving in time and material is effected in manufacture of the tap and large savings effected in the time and cost of re-sharpening the tap and in cutting threads therewith. Another important object of the invention is to provide an efficient tap which will develop a thread on a cylindrical surface to final profile within two turns of the tap and will cut a perfect thread to within two turns of the leading end of the cut made by the tap.

Further important objects of the invention are to provide a short, efficient, and economical tap for developing internal Dardelet screw threads; to provide such a tap for cutting a Dardelet thread complete at a single operation with a perfect profile from one end of the thread to a point very close to the opposite end of the thread without undue wear and strain upon the tap; and to provide such a tap especially suited for threading bottomed holes at a single operation. Other objects will be in part obvious and in part pointed out hereinafter.

In the accompanying drawings, wherein are illustrated two of the possible embodiments of the invention, Fig. 1 is a view partly in longitudinal section showing a tap for cutting Dardelet threads partly advanced into a bottomed hole;

Fig. 3 is an end view of the tap, looking at the entering or leading end of the tap;

Fig. 4 is a transverse view of the tap broken away through the middle of the four thread crest finishing cutting portions and looking in the same direction as in Fig. 3; and Fig. 5 is a side elevation of a slightly modified form of tap, this tap being of the same construction as that of Figs. 1 to 4 except that its pilot portion is slightly changed.

Figure 1:
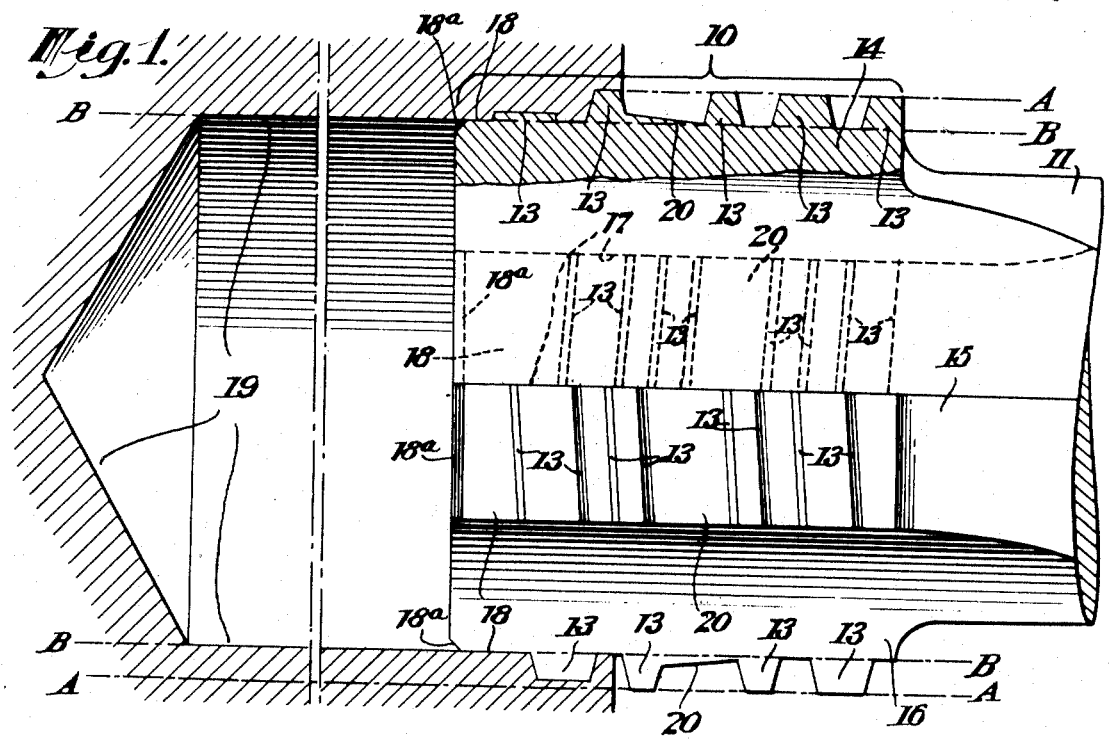

The tap has a very short threaded or working portion 10 and an integral reduced shank portion 11 which may be flatted along one side as shown at 12 to facilitate holding of the tap in a suitable driving socket or chuck. The length of the working portion is preferably such as to carry only about four turns of the rib 13 of the tap thread. Working portion 10 is fluted longitudinally in the usual manner to provide four lands 14, 15, 16 and 17 carrying the interrupted tap thread rib and also a very short pilot and reamer portion comprising a cylindrical entering portion 18 interrupted by the flutes and slightly chamfered as shown at 18ª at the entering end of the tap to facilitate entering the tap into a hole or bore and bringing said hole or bore, if undersized, to a predetermined standard diameter. In the drawings, the tap is shown acting in a bottomed hole or socket 19 of proper standard diameter.

The leading end of the tap thread rib 13 is on land 14 close to the entering end of the tap and is quite low as compared with the the depth of the socket thread groove cut by the tap and the maximum height of the tap thread rib. Preferably, and as shown, the height of the tap thread rib upon each succeeding land is increased for one turn of the rib until maximum height indicated by the line A is attained on land 17, thus affording four leading and successively active groove cutting teeth which, at the end of one turn of the tap after the groove development starts, will bring the thread groove to full depth and final profile.

The sides of the rib 13 converge slightly toward the top of the rib in the Dardelet locking thread cutting tap shown, and the top of the rib widthwise thereof is parallel with the tap axis as is also the bottom of the tap thread groove except for that portion thereof lying between the second and third turns of the tap thread rib. Except for the four successive portions on lands 14, 15, 16 and 17 between said second and third turns of the tap thread rib 13, the tap thread groove is of uniform width at the bottom and its bottom is an interrupted cylindrical surface of the same diameter as reamer portion 18, lying throughout in the circumference of a cylinder indicated by the lines B on the drawings. The trailing portions of all the teeth formed on the several lands are preferably relieved in the usual manner, as shown clearly in Figs. 3 and 4.

Figure 2:
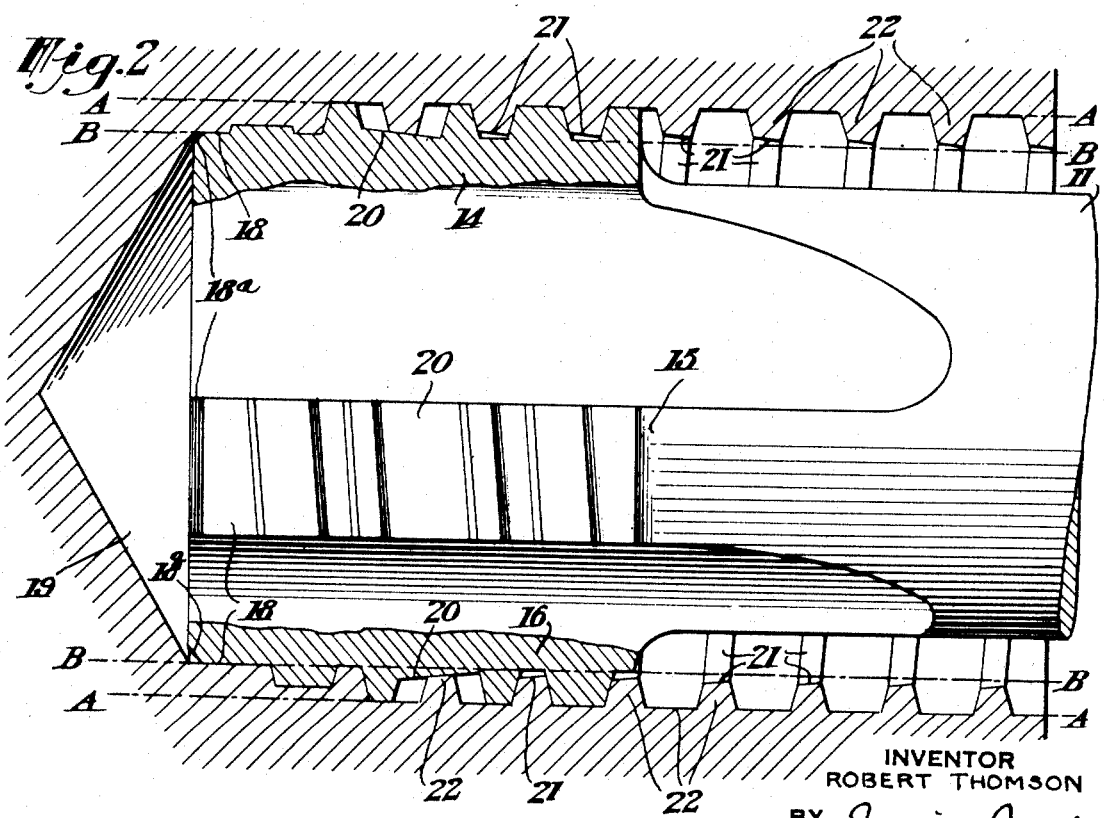
Fig. 2 is a similar view showing the threading completed.

Between said second and third turns of the tap thread rib 13, the bottom of the tap thread groove is inclined widthwise thereof at an angle to the tap axis, the angle shown being six degrees, and said groove bottom is also widened substantially by cutting back the adjacent faces of the tap thread rib, preferably from the bottom of this turn of the groove to the top of the rib as shown. The depth of this turn of the tap thread groove is also progressively decreased on successive lands, for at least a portion of the turn, being of greatest depth on land 14 at the beginning or leading end of this turn of the groove. In the construction shown, the turn of the groove having the inclined bottom wall is deepest on land 14, less deep on land 15, of still less depth on land 16, and of the same minimum depth on land 17 as on land 16, with the deepest edge of the groove on land 14 touching the cylinder B, i. e. of the same diameter as the non-inclined turns of the tap thread groove bottom. There are thus formed on the tap, immediately following the helical series of four groove cutting teeth, a helical series of four successively active crest trimming cutting edges or portions 20 for trimming down the crest of the flat topped internal thread rib (developed by the action of the groove cutters) to slightly conoidal form to form the conoidal rib-crest locking surface 21 of the well-known Dardalet self-locking internal screw thread 22, as shown in Fig. 2.

The particular stepping of the groove cutters and crest-trimmers shown and described may be varied. It will be observed that a very short tap is provided especially adapted for cutting internal Dardelet threads which brings the thread groove to full depth and profile during the first turn of its thread developing cut and brings the locking surface on the crest of the rib thus developed to final profile during the second turn of its thread developing cut, and that the work is so distributed as to afford a very economical and inexpensive tap but an efficient one well adapted for threading bottomed holes complete at one operation since it develops the perfect profile in a cylindrical bore to within two turns of the bottom of the hole.

A great saving in initial tap cost and maintenance is effected, whether the tap be employed for threading bottomed holes or through and through bores, over the long taps commonly used for general threading and the series of two (and usually three taps) commonly used successively to thread a bottomed hole.

If desired the length of the tapered pilot portion 18ª of the tap shown in Figs. 1 to 4, may be increased and its degree of taper decreased, as shown at 18ᵇ in Fig. 5, especially for threading bores of nut blanks and bores of other pieces where the diameters are not held close to standard and the tap is frequently required to perform substantial reaming actions.

By widening the turn of the tap thread groove between the second and third turns of the tap thread rib, as shown and described, wide crest cutters 20 are afforded which overhang the opposite sides of the flat top rib presented thereto for trimming to conoidal form, which wide cutters may be easily and accurately ground to the desired angle to the tap axis throughout the active (intermediate) portions of their width. The second, third and fourth turns of the tap thread rib act as a guide screw and have no cutting action to perform, although they are effective to smooth the bottom and sides of the finished thread if necessary. The trailing portions of the crest trimmers 20 are also preferably relieved, as shown. The relation of the active medial portions of trimmers 20 to the tap axis is readily apparent from a comparison thereof with the circular lines C and D (Fig. 4). The groove cutting teeth formed by the four leading portions of the interrupted tap thread rib 13 (i. e. first turn of the rib) and the teeth formed by the interrupted rib following the third turn thereof are all of the same width at the base and their bases are uniformly spaced radially from the tap axis, said teeth being materially wider through the base than the bottom of the non-widened portions of the tap thread groove. The groove cutting teeth thus cut a substantially finished thread having a flat topped rib, which rib is substantially narrower than the thread groove and which is presented to the crest trimmers for trimming of its top or crest to conoidal form as its groove development is completed during the advance of the tap into the bore 19 of the part being threaded.

What I claim is:

1. A bottoming tap for cutting Dardelet internal screw threads in a bottomed hole, characterized in that said tap has a body threaded and fluted to provide lands with a leading helical series of thread groove cutters and a following series of thread crest trimmers all within two turns of the tap thread from the leading end of the tap thread, with the leading crest trimmer on the land upon which the leading groove cutter is located and all the crest trimmers having cutting edges inclined toward the tap axis longitudinally of the tap in a direction away from the entering end of the tap.

2. A bottoming tap as claimed in claim 1, wherein each land has one of said groove cutters and one of said crest trimmers thereon, said cutters having top cutting edges parallel with the tap axis and being profiled to progressively deepen a full width thread groove and at least that one of the cutters cutting next in advance of the leading crest trimmer being of sufficient height to bring the groove to full depth.

3. A bottoming tap as claimed in claim 1, wherein each land has a pilot portion and one of said groove cutters and crest trimmers thereon, said pilot portions and said groove cutters having cutting edges parallel with the tap axis, said cutting edges of said pilot portions being equidistant from the tap axis and said cutting edges of said groove cutters increasing in radial displacement from the tap axis from land to land in the order of their recession from the entering end of the tap.

4. A tap, for cutting internal Dardelet screw threads, having a fluted body with lands provided with a tap thread, characterized in that the root width and base thickness of said tap thread are constant from end to end of the thread with the root narrower than the the base thickness and parallel with the tap axis except for approximately one intermediate turn of the tap thread, wherein the thread root is inclined toward the tap axis toward one end of the tap and has an increased width and an increased radial displacement from the tap axis and a leading cutting edge on each land for trimming off the top of a thread rib developed by the tap thread, the leading end of said intermediate turn of the thread beginning approximately one turn of the thread from the leading end of the thread.

5. A tap as claimed in claim 4, wherein the tap has a cylindrical non-threaded pilot portion interrupted by the flutes of the same diameter as the narrower portions of the thread root of the tap thread and chamfered at its leading end, while the tap thread has a crest surface which is parallel with the tap axis widthwise of the thread from end to end of the thread and the height of the tap thread increases from a minimum to a maximum in advance of the widened root portion of the thread.

6. A tap as claimed in claim 4, wherein the tap is a bottoming tap for threading bottomed holes, and has a cylindrical non-threaded pilot portion interrupted by the flutes and chamfered at its leading end, while the portion of the tap thread on each land has a crest surface which is parallel with the tap axis widthwise of the thread at the leading end of said thread portion, and the height of the tap thread increases from land to land to a maximum in advance of the widened root portion, which widened root portion tapers toward the following end of the tap.

7. A bottoming tap for cutting Dardelet internal screw threads in a bottomed hole, characterized in that the tap has a body fluted from its entering end to form lands and provided at its entering end with a short non-threaded cylindrical pilot portion interrupted by the flutes and chamfered at its leading end, said fluted body having a tapping thread thereon immediately following said pilot portion and interrupted by the flutes, which interrupted tapping thread has a constant base thickness and a root that is of constant width and of the same diameter from edge to edge as said cylindrical pilot portion and narrower than the base thickness except between the second and third portions of the interrupted thread on each land where the root is widened and tapers toward the tap axis in the direction of the following end of the tap and has an increased radial displacement from the tap axis, each portion of the interrupted thread having a leading crest edge parallel with the tap axis, and said leading crest edges of all of said thread portions from the following end of the thread to and including one in advance of the widened root portion having the same radial displacement from the tap axis while the leading crest edges of the remaining thread portions are located progressively nearer the tap axis in the order of approach of the latter thread portions to the leading end of the thread.

8. A bottoming tap as claimed in claim 7, having a tapping thread extending through only four turns about the tap axis with the widened and tapered root portion of the thread on each land having top relief and the leading edge of at least that one of said root portions which is nearest the leading end of the thread closer to the tap axis than the leading edges of the remaining widened root portions.

9. A fluted tap for cutting Dardelet internal screw threads having a tapping thread extending through approximately four turns only about the tap axis with the bottom of the thread groove parallel from edge to edge thereof with the tap axis and of constant minor diameter from end to end except for approximately one intermediate turn of the groove extending to within approximately one turn of the groove of the leading end of the tapping thread, said last mentioned intermediate turn of the groove having a bottom wall inclined to the tap axis and so radially displaced from said axis as to afford cutting portions for trimming off the top of a thread rib developed by the tapping thread.

10. A fluted tap, for cutting Dardelet internal screw threads, having a short cylindrical pilot portion interrupted by the tap flutes and chamfered at its leading end, said tap also having a leading helical series of thread groove cutters of uniform width at the base arranged with their bases uniformly radially displaced from the tap axis and a following series of thread rib crest trimming cutters arranged with their cutting edges inclined to the tap axis longitudinally of the tap and disposed to act on the crest of a thread rib developed by said groove cutters, each series of cutters extending through approximately a single turn around the tap axis and the two said series extending through approximately two consecutive turns about said axis, the tap having a tapping thread rib interrupted by the flutes and extending through approximately only four turns about the tap axis, approximately one of which turns follows the series of crest trimming cutters to form a guide screw with the said series of trimming cutters lying between other turns of said tapping thread rib and the groove cutters comprising the remainder of said rib.

In testimony whereof I hereunto affix my signature.

ROBERT THOMSON.